United States Patent [19]

Kaczur et al.

[11] 4,259,297
[45] Mar. 31, 1981

[54] CHROMATE REMOVAL FROM CONCENTRATED CHLORATE SOLUTION BY CHEMICAL PRECIPITATION

[75] Inventors: Jerry J. Kaczur; Sudhir K. Mendiratta, both of Cleveland, Tenn.

[73] Assignee: Olin Corporation, New Haven, Conn.

[21] Appl. No.: 71,910

[22] Filed: Sep. 4, 1979

[51] Int. Cl.³ .............................................. C01G 37/02
[52] U.S. Cl. ..................................... 423/55; 423/475; 423/607; 204/95; 210/913; 210/768; 210/806
[58] Field of Search ....................... 423/55, 475, 607; 204/95; 210/66, 73 R, 74, DIG. 30

[56] References Cited

U.S. PATENT DOCUMENTS

| | | | |
|---|---|---|---|
| 3,398,093 | 8/1968 | Ferney | 210/74 |
| 3,728,273 | 4/1973 | Bruen | 210/DIG. 30 |
| 3,843,769 | 10/1974 | Partridge | 423/475 |
| 3,896,209 | 7/1975 | Fournier | 423/55 |
| 3,961,029 | 6/1976 | Senoo | 423/55 |
| 3,981,965 | 9/1976 | Gancy | 423/55 |
| 4,139,460 | 2/1979 | Ghelli | 423/55 |

FOREIGN PATENT DOCUMENTS 52-47701  1/1977  Japan ........................ 423/607

OTHER PUBLICATIONS

Mellor, *Inorganic and Theoretical Chemistry*, Longmans Green & Co., N.Y., 1931, vol. XI, pp. 336, 337.

*Primary Examiner*—Brian E. Hearn
*Attorney, Agent, or Firm*—Donald F. Clements; James B. Haglind

[57] ABSTRACT

A method has been devised for removing hexavalent chromium from concentrated aqueous alkali metal chlorate solution by reacting the solution with an inorganic sulfur containing compound and separating divalent and trivalent chromium compounds from the solution. Alkali metal hypohalites may be simultaneously removed from the chlorate solution by reaction with excess inorganic sulfur containing compound.

28 Claims, 1 Drawing Figure

PROCESS FOR REMOVAL AND RECOVERY OF CHROMIUM PRECIPITATES

CHROMATE REMOVAL FROM CONCENTRATED CHLORATE SOLUTION BY CHEMICAL PRECIPITATION

This invention relates to a process for removing hexavalent chromium from impure aqueous alkali metal chlorate solutions. More particularly, it relates to the removal of alkali metal dichromates from concentrated aqueous solutions of alkali metal chlorates by reacting said solutions with inorganic sulfur containing compounds. Most particularly, the present invention relates to the removal of sodium dichromate from concentrated aqueous sodium chlorate solutions without significantly altering the ratio of sodium chlorate to sodium chloride in the strong oxidizing solution.

In the production of chlorine dioxide for use in the bleaching of chemical celluosic pulps, an aqueous solution of an alkali metal chlorate and an alkali metal chloride, particularly sodium chlorate and sodium chloride is reacted with a mineral acid, particularly sulfuric acid. In such a process, the aqueous solution contains sodium chlorate and sodium chloride in a selected ratio which is conducive to optimum production of chlorine dioxide.

The aqueous solution of the sodium chlorate and sodium chloride is conventionally produced by the electrolysis of brine in electrolytic cells, usually bipolar electrolytic cells, the extent of the electrolysis suitably being controlled to produce an effluent from the cell in which the sodium chlorate and sodium chloride have essentially the selected ratio for optimum production of chlorine dioxide in the chlorine dioxide generator. The selected ratio of sodium chlorate to sodium chloride is in the range from about 1:1 to about 20:1 and preferably in the range from about 2:1 to about 15:1. However, in the electrolysis of the sodium chloride in the bipolar electrolytic cells to form sodium chlorate, it is conventional to add chromates to the electrolyte in the cell because the chromates significantly improve the current efficiency of the cells in the conversion of the sodium chloride to sodium chlorate. Chromate ion occurs in significant amounts in the cell effluent. It is desirable to remove chromate ion from the cell effluent before it is processed in the chlorine dioxide generator. Also, chromium is a valuable material; hence, it is desirable to recover it for reprocessing into chromate for subsequent re-use in the electrolytic cells. Further, if the chromate passes into the chlorine dioxide generator, it may be present in the waste effluent from the chlorine dioxide generator, and eventually reappear in the outside environment as a toxic pollutant.

U.S. Pat. No. 3,961,029 issued to Yoshio Senoo on June 1, 1976 discloses that chromate ion can be recovered from an aqueous waste liquor by employing in a first step a reducing agent such as sodium hydrogen sulfite at an acidic pH and precipitating the chromium as chromium hydroxide at an alkaline pH. U.S. Pat. No. 3,981,965 issued to Alan B. Gancy et al. on Sept. 21, 1976 discloses a method of treating solid waste material containing minor amounts of water soluble chromium compounds with sodium dithionite. However, there is no teaching of the applicability of either of these aforementioned processes to a highly concentrated aqueous alkali metal chlorate solution, a strong oxidizing solution.

U.S. Pat. No. 3,843,769 issued to Harold deVere Partridge, et al. on Oct. 22, 1974 teaches a process whereby alkali metal chlorate solutions containing hexavalent chromium are treated with at least about a 3-molar proportion of a water-soluble sulfide such as sodium sulfide, sodium bisulfide, potassium bisulfide or hydrogen sulfide. Preferably an excess of the sulfide is added to the solution. Then the solution is acidified to a pH below about 5, whereby the trivalent chromium is precipitated as an insoluble product, and removed from the solution. Partridge et al discloses the treatment in this way of chlorate solutions having about 350 grams per liter of $NaClO_3$, but do not disclose the treatment of higher concentrations of sodium chlorate. A further discussion of the above-noted patent and other chemical methods of precipitating $Cr(OH)_3$ is found in U.S. Pat. No. 4,086,150 issued to Bruno Kindl et al. on Apr. 25, 1978.

The above-mentioned prior art processes for the removal of hexavalent chromium from aqueous solutions containing hexavalent chromium have serious drawbacks in that $H_2S$ gas may be generated and undesirable sulfur compounds such as elemental sulfur may be formed in the sodium chlorate solution.

In spite of these and other methods, there is a long felt need at the present time for a process to remove hexavalent chromium from an aqueous solution of alkali metal chlorate by the selective reduction of hexavalent chromium, without significant reduction of alkali metal chlorate, at a pH value which results in the separation of chromium compounds as for example an insoluble trivalent or divalent chromium hydroxide, which can easily be removed from the aqueous alkali metal chlorate solution.

OBJECTS

It is a primary object of this invention to remove hexavalent chromium from concentrated aqueous solutions of alkali metal chlorates.

It is another object of this invention to remove hexavalent chromium from aqueous solutions of concentrated alkali metal chlorates by the selective reduction of hexavalent chromium, without reduction of alkali metal chlorate or production of hydrogen sulfide.

It is yet another object of this invention to remove hexavalent chromium from concentrated aqueous solutions of alkali metal chlorate solution without the introduction of significant amounts of impurities resulting from the reducing agent employed or reaction products thereof.

It is still another object of this invention to remove hexavalent chromium from aqueous solutions of concentrated alkali metal chlorates without significantly altering the ratio of alkali metal chlorate to alkali metal chloride in the solutions.

It is an additional object of this invention to recover and reuse precipitated chromium hydroxide.

It is a further object of this invention to remove alkali metal hypohalite from aqueous solutions of concentrated alkali metal chlorates.

It is a still further object of this invention to remove heavy metals from aqueous solutions of concentrated alkali metal chlorates.

BRIEF DESCRIPTION OF THE INVENTION

The foregoing objects of the invention are accomplished in a process for removing hexavalent chromium from an impure aqueous alkali metal chlorate solution containing hexavalent chromium as an impurity which comprises:

(a) adjusting the pH of the impure aqueous solution to a first intermediate pH in the range from about 9 to about 13;

(b) reacting an inorganic sulfur compound selected from the group consisting of alkali metal bisulfite, alkali metal sulfite, alkali metal thiosulfate, alkali metal thiosulfite, alkali metal metabisulfite, alkaline earth metal bisulfite, alkaline earth metal thiosulfate, alkaline earth metal metabisulfite, alkali metal dithionite, alkaline earth metal dithionite, ferric sulfite, ferric thiosulfate, ammonium sulfite, ammonium bisulfite, ammonium thiosulfate, and mixtures thereof with the impure aqueous solution to form an aqueous slurry of solid particles of trivalent and divalent chromium compounds in an aqueous solution;

(c) adjusting the pH of the aqueous slurry of alkali metal chlorate to a second intermediate pH in the range from about 2 to about 4;

(d) further adjusting the pH of the aqueous slurry to a final pH in the range from about 6 to about 8; and (e) separating the solid particles of divalent and trivalent chromium compounds from the aqueous solution, whereby hydrogen sulfide is organoleptically nondetectable.

DETAILED DESCRIPTION OF THE INVENTION

Any aqueous solution of alkali metal chlorate which contains reducible hexavalent chromium may be treated according to the process of this invention. Typical solutions are aqueous alkali metal chlorate solutions, aqueous alkaline earth metal chlorate solutions, and mixtures thereof.

Typical alkali metal chlorates include sodium chlorate, potassium chlorate, lithium chlorate, rubidium chlorate, cesium chlorate and mixtures thereof.

Typical alkaline earth metal chlorates include beryllium chloride, magnesium chlorate, calcium chlorate, strontium chlorate, barium chlorate, radium chlorate and mixtures thereof.

To simplify the description, the invention will be described in terms of an aqueous sodium chlorate solution although any other alkali metal chlorate, alkaline earth metal chlorate or mixtures thereof may be substituted with equivalent results. For example, one may substitute potassium chlorate, lithium chlorate, barium chlorate, magnesium chlorate, calcium chlorate, mixtures thereof and the like.

The electrolytic production of sodium chlorate has been effected in electrochemical cells typically provided with graphite, steel, or titanium cathodes. To minimize corrosion of steel cathode and to improve the overall chlorate efficiency of the cell possibly by decreasing hypohalite reduction at the cathode, hexavalent chromium compounds have been conventionally added to the cell liquor. The hexavalent chromium compound is usually added to the cell liquor in the form of sodium dichromate in an amount sufficient to provide a hexavalent chromium concentration in the range from about 0.1 to about 20.0 and preferably from about 0.2 to about 10.0 grams sodium dichromate per liter of solution.

Hexavalent chromium may be added to sodium chlorate cell liquor in any suitable form. For example, water soluble hexavalent chromium may be supplied as $Na_2CrO_4$ (sodium chromate), $Na_2Cr_2O_7$ (sodium dichromate), $CrO_3$ (chromic acid), potassium dichromate, potassium chromate, mixtures thereof and the like. Throughout this specification and claims, when reference is made to hexavalent chromium, it is to be understood that any source of soluble hexavalent chromium may be substituted with equivalent results.

In *Encyclopedia of Chemical Technology*, by Kirk-Othmer, Third Edition, Volume 5, pages 633-645, a variety of electrochemical cells are described for producing sodium chlorate. The teachings of that article are incorporated herein by reference.

A typical analysis of an aqueous sodium chlorate liquor from a typical sodium chlorate cell plant is as follows:

| Component | Typical Analysis (grams per liter) | Min./Max. Analysis Preferred (grams per liter) | Min./Max. Analysis Broad (grams per liter) |
|---|---|---|---|
| $NaClO_3$ | 600 | 250–675 | 100–750 |
| NaCl | 150 | 100–300 | 20–400 |
| NaOCl | 1 | 0.2–4 | 0.1–5 |
| $Na_2SO_4$ | 5 | 1–10 | 0.1–30 |
| Hexavalent Chromium | 2 | 0.2–10 | 0.1–20 |

Greater or lesser concentrations of the components shown above may be present in aqueous sodium chlorate liquor. In addition, other minor components may also be present.

Additionally, as indicated in the Kirk-Othmer article cited above, the presence of alkali metal hypohalites such as sodium hypochlorite, potassium hypochlorite, mixtures thereof and the like is not a strict requirement of this invention but such alkali metal hypohalites are expected components in a typical electrochemical cell plant producing alkali metal chlorates such as sodium chlorate.

The term "impure aqueous sodium chlorate liquor" is employed throughout the claims and description to denote any alkyl metal or alkaline earth metal chlorate liquor containing reducible hexavalent chromium.

The pH of typical impure aqueous sodium chlorate liquor is in the range from about 2 to about 12 and preferably from about 3 to about 10.

In the process of this invention, when the pH of an impure aqueous sodium chlorate solution containing hexavalent chromium is less than about 9, sufficient inorganic base is added to adjust the initial pH to a first intermediate pH which is within the range from about 9 to about 13 and preferably from about 10 to about 12.

Typical inorganic bases include aqueous solutions of sodium hydroxide, potassium hydroxide, mixtures thereof and the like. The particular inorganic base chosen is one that preferably corresponds to the particular alkali metal chlorate solution undergoing chromate removal. For example, when treating a sodium chlorate solution, then it is preferred to employ sodium hydroxide as the inorganic base.

The inorganic base is typically an aqueous solution of the inorganic base having a concentration in the range from about 5 to about 75 and preferably from about 10 to about 60 percent inorganic base by weight.

Sufficient water soluble inorganic sulfur containing compound is added to the impure aqueous sodium chlorate solution to provide a molar ratio of inorganic sulfur containing compound to hexavalent chromium in the aqueous solution. For example, the molar ratio of $Na_2S_2O_4$ to $Na_2Cr_2O_7$ is in the range from about 2.2:1 to about 8:1 and preferably from about 2.4:1 to about 4:1. The molar ratio of $Na_2SO_3$ to $Na_2Cr_2O_7$ is in the range from about 7.6:1 to about 14:1 and preferably from about 8:1 to about 12:1. The molar ratio of $Na_2S_2O_5$ to $Na_2Cr_2O_7$ is in the range from about 3:1 to about 10:1 and preferably from about 2.7:1 to about 5:1.

The inorganic sulfur containing compound also reacts with any alkali metal hypohalite present such as alkali metal hypochlorite to remove alkali metal hypochlorite by chemical reaction.

A preferred method of removing alkali metal hypohalite present in impure sodium chlorate solution is to chemically decompose the hypohalite before practicing the process of this invention.

The inorganic sulfur containing compound also reacts with any heavy metals present, such as mercury, to precipitate heavy metals by chemical reaction, for example mercury sulfide.

Typical water soluble inorganic sulfur containing compounds which may be employed in the process of this invention include (i) alkali metal bisulfite such as sodium bisulfite, potassium bisulfite, lithium bisulfite and mixtures thereof; (ii) alkali earth metal bisulfite such as calcium bisulfite, magnesium bisulfite and mixtures thereof; (iii) alkali metal metabisulfite such as sodium metabisulfite, potassium metabisulfite, lithium metabisulfite, and mixtures thereof; (iv) alkali metal sulfite such as sodium sulfite, potassium sulfite, lithium sulfite and mixtures thereof; (v) alkaline earth metal sulfite such as calcium dihydrogen sulfite, magnesium dihydrogen sulfite; (vi) alkali metal thiosulfate such as sodium thiosulfate, potassium thiosulfate, lithium thiosulfate, and mixtures thereof; (vii) alkaline earth metal thiosulfate such as calcium thiosulfate, magnesium thiosulfate, and mixtures thereof; (viii) alkali metal dithionite, such as sodium dithionite, potassium dithinite, lithium dithionite, and mixtures thereof;

(ix) alkaline earth metal dithionite such as calcium dithionite, magnesium dithionite, and mixtures thereof; and (x) ferric sulfite, ferric thiosulfate, and mixtures thereof; and (xi) ammonium sulfite, ammonium hydrogen sulfite, ammonium thiosulfate, and mixtures thereof; (xii) alkaline earth metal metabisulfite such as calcium metabisulfite, magnesium metabisulfite, and mixtures thereof; (ix) alkaline earth metal dithionite such as calcium dithionite, magnesium dithionite, and mixtures thereof; and (x) ferric sulfite, ferric thiosulfate, and mixtures thereof; and (xi) ammonium sulfite, ammonium hydrogen sulfite, ammonium thiosulfate, and mixtures thereof; (xii) alkaline earth metal metabisulfite such as calcium metabisulfite, magnesium metabisulfite, and mixtures thereof.

Without being bound by theory, it is believed that an inorganic sulfur compound such as sodium thiosulfate reacts with sodium dichromate and water to form divalent chromium hydroxide and sodium sulfate according to equation (1):

(1)

Similarly, it is believed that an inorganic sulfur containing compound such as sodium sulfite reacts with sodium dichromate, water, and hydrochloric acid to form chromium hydroxide, sodium sulfate, and sodium chloride according to equation (2):

Similarly, it is believed that sodium dithionite reacts with sodium dichromate and water to form chromium hydroxide and sodium sulfate according to equation (3):

Similarly, it is believed that sodium bisulfite reacts with sodium dichromate, water, and hydrochloric acid to form chromium hydroxide, sodium sulfate, and sodium chloride according to equation (4):

Additional inorganic sulfur containing compound must be added to the impure aqueous sodium chlorate solution to provide a molar ratio of additional inorganic sulfur containing compound to alkali metal hypohalite in the aqueous solution in the range from about 0.4:1 to about 2:1 and preferably from about 0.5:1 to about 0.6:1.

Yet additional inorganic sulfur containing compounds must be added to the impure aqueous sodium chlorate solution to provide a molar ratio of additional inorganic sulfur containing compound to heavy metals such as mercury in the aqueous solution in the range from about 1:1 to about 10:1 and preferably to about 2:1 to about 8:1.

The pH of the impure aqueous sodium chlorate solution is maintained in the aforementioned range for a time period in the range from about 5 to about 60 and preferably from about 10 to about 30 minutes while the solution is vigorously stirred. Any suitable agitation means may be employed; however, air agitation is preferred.

Without being bound by theory, it is believed that a chromium chloride complex hydrate $CrCl_3 \cdot XH_2O$ is formed at the high alkaline pH which is not fully reduced.

It has been found in these reactions that the formation of and subsequent removal of the solid trivalent chromium compound $Cr(OH)_3$ and the solid divalent chromium compound $Cr(OH)_2$ are remarkably enhanced when the pH of the impure solution, after inorganic sulfur containing compound has been added to the impure aqueous sodium chlorate solution, is pH adjusted in the range from about 2 to about 4 and preferably from about 2.5 to about 3.5.

It is further believed that lowering of the pH to a strong acid region effects a more complete reduction of the $CrCl_3 \cdot XH_2O$ complex hydrate to soluble $Cr(OH)_3$.

When the first intermediate pH of the impure aqueous sodium chlorate solution is greater than about 9, sufficient inorganic acid is added to adjust the first intermediate pH to a second intermediate pH within the range from about 2 to about 4 and preferably from about 2.5 to about 3.0.

Any inorganic acid may be employed in the process of this invention which is capable of controlling the pH of the impure aqueous sodium chlorate solution in the range from about 2 to about 4 and which does not act as a reducing agent for the alkali metal chlorate and hexavalent chromium present in the solution.

Typical inorganic acids include acids such as hydrochloric acid, sulfuric acid, phosphoric acid, nitric acid, ortho-phosphoric acid, pyrophosphoric acid, mixtures thereof and the like.

The inorganic acid is typically an aqueous solution of the inorganic acid having a concentration in the range from about 1 to about 15 and preferably from about 5 to about 10 percent inorganic acid by weight.

The solution is maintained at a second intermediate pH in the aforedescribed range for a time period in the range from about 5 to about 60 and preferably from about 10 to about 30 minutes while the solution is vigorously stirred. Any suitable agitation means may be employed; however, air agitation is preferred.

Thereafter, the pH of the solution is adjusted to a final pH value in the range from about 6 to about 8 and preferably from about 6.5 to about 7.5 by the addition of a sufficient amount of the previously described inorganic bases. As the pH of the solution tends to become more basic, the $Cr(OH)_3$ becomes less soluble in solution.

The temperature of the impure aqueous sodium chlorate solution during reaction, precipitation and pH adjustment steps is in the range from about 20° to about 100° C. and preferably from about 25° to about 80° C. The reaction is generally carried out at atmospheric pressure but super- or subatmospheric pressure may be employed, if desired.

Either a batch or a continuous operation can be used, although the batch system is preferable.

The aforementioned process steps of reaction and pH adjustment result in the formation of a slurry of solid particles of $Cr(OH)_3$ or $Cr(OH)_2$ (from about 1 to about 5 percent by weight), hexavalent chromium (less than about 5 ppm), in an aqueous solution also containing sodium chlorate and sodium chloride in a weight ratio essentially the same as the weight ratio in the impure aqueous sodium chlorate solution.

The solid particles of trivalent chromium compound, $Cr(OH)_3$, and divalent chromium compound, $Cr(OH)_2$, are separated from the sodium chlorate solution by any suitable solid-liquid separation technique, such as by settling, filtering, and the like.

Figure 1:
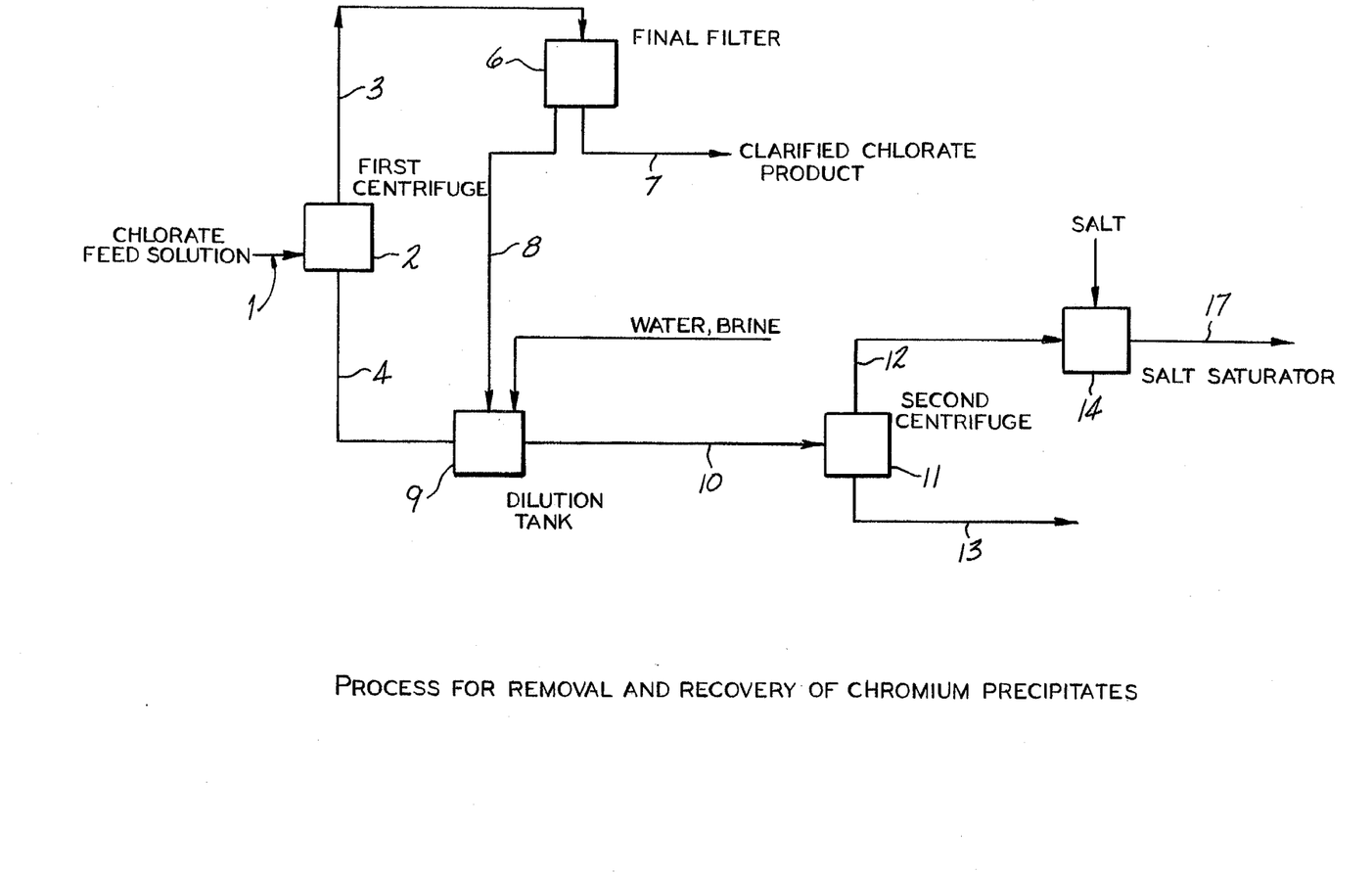
The FIGURE shows a schematic view of a process for removal and recovery of chromium precipitates.

However, a preferred method of removal and recovery of chromium precipitates such as $Cr(OH)_3$ and $Cr(OH)_2$ by centrifuging from aqueous sodium chlorate solutions is shown in the accompanying FIGURE.

In the FIGURE, aqueous solution of sodium chlorate as formed in the process of this invention is conveyed by process line 1 to a first centrifuge 2 to produce an overflow stream 3 and an underflow stream 4. First centrifuge 2 is preferably a solids ejecting disc type centrifuge such as a centrifuge marketed by the DeLaval Company known as BRPX-213 solids ejecting centrifuge disc type.

The $Cr(OH)_3$ solids content in overflow stream 3 is in the range from about 0.01 to about 0.05 percent by weight. After exiting from first centrifuge 2, the overflow stream 3 is conveyed to a final filter 6 to produce a clarified stream 7 and a filter cake (not shown). A preferable final filter 6 is a polishing filter containing filter cartridge comprised of polyethylene or polyvinyl chloride having about a 5-micron filter size. An automatic pressure activated filter is preferred as final filter 6 although any suitable manual filter could be employed.

Clarified stream 7 contains less than about 0.001 percent by weight solid $Cr(OH)_3$ and $Cr(OH)_2$ and is conveyed to chlorate product storage (not shown) for sale or is otherwise utilized.

The clarified liquid in stream 7 is an aqueous solution of sodium chlorate and sodium chloride which is substantially free of chromium ions, $Cr(OH)_2$ and $Cr(OH)_3$. The clarified solution is useful as feed for chlorine dioxide generators since the weight ratio of alkali metal chlorate, such as sodium chlorate, to alkali metal chloride, such as sodium chloride, remains substantially the same throughout the process of this invention.

Filter cake ($Cr(OH)_3$ solids) not shown is periodically removed from final filter 6 as required by backwashing final filter 6 with clarified stream 7 to produce backwash stream 8. Backwash stream 8 and underflow stream 4 from centrifuge 2 containing in the range from about 15 to about 30 percent solids are conveyed to and combined together in dilution tank 9 to form a slurry. Water or brine is added as needed to the slurry in dilution tank 9 to maintain the specific gravity of the resulting slurry in the range from about 1.0 to about 1.2. Specific gravity reduction is done to improve the solids separation from the liquid.

Effluent stream 10 from dilution tank 9 is conveyed to a second centrifuge 11 to produce an overflow stream 12 and an underflow stream 13.

An additional final filter (not shown) may be employed on overflow stream 12 to further clarify overflow stream 12. Solids collected therein could be conveyed to dilution tank 9.

Overflow stream 12 contains in the range from about 0.001 to about 0.05 percent solids and valuable chlorate and is thereafter conveyed to salt saturator 14 where an alkali metal halide or salt such as sodium chloride, potassium chloride, or mixtures thereof is added as required to saturate overflow stream 12. Salt saturated overflow stream 17 thereby produced is thereafter conveyed to a sodium chlorate plant feed storage (not shown) for use in electrolytically preparing sodium chlorate or as otherwise utilized. The particular alkali metal halide or salt added to overflow stream 12 typically corresponds to the particular chlorate liquor employed herein. For example, sodium chloride salt or sodium chloride brine is added to overflow stream 12 in salt saturator 14 when sodium chlorate is employed in the process of this invention.

The following examples are presented to define the invention more fully without any intention of being limited thereby. All parts and percentages are by weight unless indicated otherwise.

EXAMPLE 1

In this example, hexavalent chromium was substantially removed from a concentrated aqueous sodium chlorate solution by employing sodium bisulfite.

About 500 milliliters of a concentrated aqueous solution of sodium chlorate containing about 637 grams sodium chlorate per liter, about 43 grams sodium chloride per liter, and about 0.5 grams sodium dichromate ($Na_2Cr_2O_7 \cdot 2H_2O$) was prepared. The initial pH of the aqueous sodium chlorate solution was about 7. The weight ratio of sodium chlorate to sodium chloride was calculated to about 14.8:1. The initial temperature of the aqueous sodium chlorate solution was maintained at about 50° C. in this example.

Sufficient dilute (about 20 percent strength) aqeuous sodium hydroxide solution was added to about 500 milliliters of the sodium chlorate solution to increase the initial pH to a first intermediate pH of about 11.7.

About six milliliters of about a 40 weight percent aqueous solution of sodium bisulfite (about 2.50 grams sodium bisulfite) was added to the 500-milliliter portion of the aqueous sodium chlorate solution.

The color of the resultant solution changed from bright yellow to blue-green. The resultant solution was vigorously stirred for about 15 minutes.

A sufficient amount of about a five percent aqueous solution of hydrochloric acid was slowly admixed with the aqueous sodium chlorate solution to decrease the pH to a second intermediate pH of about 3. As the pH of the solution slowly decreased from about 11 to about 9 and then to about 3, the resultant solution changed color from blue-green to dark blue-green and the intensity of the dark blue-green increased. The solution was vigorously stirred for about another 15 minutes.

A sufficient amount of about 20 percent NaOH was admixed with the aqueous sodium chlorate solution to increase the pH to a final pH of about 7.2. A dark blue-green precipitate formed at a pH of about 5.

The solution was then filtered through a fine millipore glass fiber filter of about 0.5 micron size using an aspirator forming a filter cake of solid dark blue-green particles of an insoluble chromium compound believed to be $Cr(OH)_3$ and an essentially colorless filtrate.

The odor of $H_2S$ was absent during the entire example.

The concentration of hexavalent chromium in the essentially colorless filtrate was determined to be less than about 0.01 part chromium per million by weight by atomic absorption method. This analysis indicated nearly complete hexavalent chromium removal from the concentrated aqueous solution of sodium chlorate. Analysis of the filtrate indicated essentially no sodium chlorate reacted. The final sodium chlorate to sodium chloride weight ratio was calculated to be about 13.6:1.

EXAMPLE 2

In this example, hexavalent chromium was substantially removed from a concentrated aqueous sodium chlorate solution by employing sodium sulfite.

About 500 milliliters of a concentrated aqueous solution of sodium chlorate containing about 640 grams sodium chlorate per liter, about 45 grams sodium chloride per liter, and about 0.5 grams sodium dichromate ($Na_2Cr_2O_7.2H_2O$) was prepared. The initial pH of the aqueous sodium chlorate solution was about 7. The weight ratio of sodium chlorate to sodium chloride was calculated to be about 14.2:1. The initial temperature of the aqueous sodium chlorate solution was maintained at about 50° C. in this example.

Sufficient dilute (about 20 percent strength) aqueous sodium hydroxide solution was added to about 500 milliliters of the sodium chlorate solution to adjust the initial pH to a first intermediate pH of about 11.8.

About 12 milliliters of about a 9 weight percent aqueous solution of sodium sulfite (about 1.10 grams sodium sulfite) was added to about a 500 milliliter portion of the aqueous sodium chlorate solution. The color of the resultant solution changed from bright yellow to green and then to blue-green. The resultant solution was stirred for about 15 minutes.

A sufficient amount of a five percent aqueous solution of hydrochloric acid was slowly admixed with the aqueous sodium chlorate solution to decrease the first intermediate pH to a second intermediate pH of about 2.5. As the pH of the solution slowly decreased from about 11 to about 9 and then to about 2.5, the resultant solution changed color from blue-green to dark blue-green. The solution was stirred for about another 15 minutes.

A sufficient amount of about 20 percent NaOH was admixed with the aqueous sodium chlorate solution to increase the second intermediate pH to a final pH of about 7.1. A brown/yellow precipitate formed at a pH of about 5.5.

The solution was then filtered through a fine millipore glass fiber filter of about 0.5 micron size using an aspirator forming a brown/yellow filter cake of solid particles of an insoluble chromium compound believed to be $Cr(OH)_2$ and a colorless filtrate.

The odor of $H_2S$ was absent during the entire example.

The concentration of hexavalent chromium in the essentially colorless filtrate was determined to be less than about 0.01 part chromium per million by weight by atomic absorption. This analysis indicated nearly complete hexavalent chromium removal from the concentrated aqueous solution of sodium chlorate. Analysis of the filtrated indicated essentially no sodium chlorate reacted. The final sodium chlorate to sodium chloride weight ratio was calculated to be about 13.2:1.

EXAMPLE 3

In this example, hexavalent chromium was substantially removed from a concentrated aqueous sodium chlorate solution by employing sodium thiosulfate.

Sufficient dilute (about 20 percent strength) aqueous sodium hydroxide solution was added to about a 500-milliliter portion of the sodium chlorate solution prepared in Example 2 to adjust the initial pH to a first intermediate pH of about 11.6.

About 5 milliliters of about 50 weight percent aqueous solution of sodium thiosulfate (about 2.50 grams sodium thiosulfate) was added to about a 500-milliliter aqueous sodium chlorate solution as described in Example 2.

The color of the resultant solution changed from bright yellow to green and then to blue-green. The resultant solution was stirred for about 15 minutes.

A sufficient amount of five percent aqueous solution of hydrochloric acid was slowly admixed with the aqueous sodium chlorate solution to decrease the first intermediate pH to a second intermediate pH of about 2.7. As the pH of the solution slowly decreased from about 11 to about 9 and then to about 2.7, the resultant solution changed color from blue-green to a murky brown blue-green color.

A sufficient amount of about 20 percent NaOH was admixed with the aqueous sodium chlorate solution to increase the second intermediate pH to a final pH of about 7.1. A brown/yellow precipitate formed at a pH of about 5.5.

The solution was then filtered through a fine millipore glass fiber filter of about 0.5 micron size using an aspirator forming a brown/yellow filter cake of solid particles of an insoluble chromium compound believed to be $Cr(OH)_2$ and a colorless filtrate.

The concentration of hexavalent chromium in the colorless filtrate was determined to be less than about 0.5 part chromium per million by weight by atomic absorption. This analysis indicated nearly complete hexavalent chromium removal from the concentrated aqueous solution of the sodium chlorate. Analysis of the filtrate indicated essentially no sodium chlorate reacted.

The final sodium chlorate to sodium chloride weight ratio was calculated to be about 13.2:1.

The odor of $H_2S$ was absent during the entire example.

EXAMPLE 4

In this example, hexavalent chromium was substantially removed from a concentrated aqueous sodium chlorate solution by employing sodium dithionite.

A small amount of dilute (about 20 percent strength) aqueous sodium hydroxide solution was added to about a 500-milliliter portion of the sodium chlorate solution prepared in Example 1 to adjust the initial pH of about 6.9 to a first intermediate pH of about 7.

About 1.10 grams of solid sodium dithionite was added to the 500-milliliter portion of the aqueous sodium chlorate solution. The color of the resultant solution changed from bright yellow to green and then to blue-green. The resultant solution was stirred for about 10 minutes.

A sufficient amount of a five percent aqueous solution of hydrochloric acid was admixed with the aqueous sodium chlorate solution to decrease the first intermediate pH to a second intermediate pH of about 2.7. The resultant solution changed color from blue-green to dark blue-green as the pH of the solution slowly decreased from about 7 to about 2.7. The solution was stirred for another 15 minutes.

A sufficient amount of about 20 percent NaOH was admixed with the aqueous sodium chlorate solution to increase the second intermediate pH to a final pH of about 6.9. A blue precipitate formed at a pH of about 5.

The solution was then filtered through a fine millipore glass fiber filter of about 0.5 micron size using an aspirator forming a filter cake of blue solid particles of insoluble trivalent chromium compound and a colorless filtrate.

The concentration of hexavalent chromium in the colorless filtrate was determined to be less than about 0.01 part chromium per million by atomic absorption. This analysis indicated nearly complete hexavalent chromium removal from the concentrated aqueous solution of impure aqueous sodium chlorate. Analysis of the filtrate indicated essentially no sodium chlorate reacted. The final sodium chlorate to sodium chloride weight ratio was calculated to be about 14.2:1. The odor of $H_2S$ was absent during this example.

EXAMPLE 5

Chromium Removal From Sodium Chlorate Solution 700 gpl Sodium Chlorate, 50 gpl Salt, and 2 gpl Sodium Hypochlorite

| Amount of Sodium Dithionite Added,[1] gm | Chromium Conc. Before Treat., $Na_2Cr_2O_7$ | Chromium Conc. After Filtra., [2] $Na_2Cr_2O_7$ | NaOCl Before Treat., gpl | NaOCl After Filtra., [2] gpl |
|---|---|---|---|---|
| 1.2 | 0.896 | .640 | 2.34 | 0.142 |
| 1.3 | 0.883 | .184 | 1.09 | 0.011 |
| 1.4 | 0.870 | .015 | 2.46 | 0.011 |
| 1.5 | 0.896 | .038 | 0.859 | 0.011 |

[1] Initial solution - 385 ml.
[2] Vacuum filtration through a ⅛ inch Dicalite 4106 bed deposited on medium grade fritted glass filter.
[3] 50° C. temperature
The procedure in Example 5 was the same as the procedure of Example 4. Temperature about 50° C.

EXAMPLE 6

MERCURY AND CHROMIUM REMOVAL FROM SODIUM CHLORATE SOLUTIONS USING SODIUM DITHIONITE
Bench scale tests, 200 ml solutions of 700 gpl $NaClO_3$/50 gpl NaCl, 1.25 gpl $Na_2Cr_2O_7$, Hg added as $Hg_2Cl_2$.
Temperature - 50° C.
OLIN SODIUM DITHIONITE TECHNOLOGY

| gm $Na_2S_2O_4$ Added | Start ppm Hg | Start ppm Cr | Finish ppm Hg | Finish ppm Cr | % Removal Hg | % Removal Cr |
|---|---|---|---|---|---|---|
| 0.70g | 1.3 | 143 | .04 | .74 | 96.9% | 99.5% |
| 0.70g | 3.6 | 143 | .03 | .78 | 99.2% | 99.9% |
| 0.70g | 7.0 | 141 | .06 | .50 | 99.1% | 99.9% |
| 0.70g | 8.6 | 163 | .46 | .42 | 94.7% | 99.7% |
| 0.80g | 10.2 | 145 | .10 | 12.30 | 99.0% | 91.5% |

What is claimed is:

1. A process for removing hexavalent chromium from an impure aqueous alkali metal chlorate solution containing hexavalent chromium as an impurity which comprises:
    (a) adjusting the pH of said impure aqueous solution to a first intermediate pH in the range from about 9 to about 13;
    (b) reacting an inorganic sulfur compound selected from the group consisting of alkali metal bisulfite, alkali metal sulfite, alkali metal thiosulfate, alkali metal metabisulfite, alkaline earth metal bisulfite, alkaline earth metal thiosulfate, alkaline earth metal metabisulfite, alkali metal dithionite, alkaline earth metal dithionite, ferric sulfite, ferric thiosulfate, and mixtures thereof with said impure aqueous solution to form an aqueous slurry of solid particles of trivalent and divalent chromium compounds in an aqueous solution;
    (c) adjusting the pH of said aqueous slurry of alkali metal chlorate to a second intermediate pH in the range of from about 2 to about 4;
    (d) further adjusting to the pH of said aqueous slurry to a final pH in the range from about 6 to about 8; and
    (e) separating said solid particles of divalent and trivalent chromium compounds from said aqueous solution, whereby hydrogen sulfide is organoleptically nondetectable.

2. The process of claim 1, wherein said first intermediate pH is in the range from about 10 to about 12.

3. The process of claim 2, wherein said final pH is in the range from about 6.5 to about 7.5.

4. The process of claim 1, wherein said solid particles of divalent and trivalent chromium compounds are separated from said aqueous solution by centrifuging.

5. The process of claim 4, wherein said centrifuging is comprised of:
    (a) passing said aqueous solution containing said solid particles through a first centrifuge to form:
        (i) an overflow aqueous solution having a solid particle concentration in the range from about 0.02 to about 0.05 percent, and
        (ii) an underflow aqueous solution having a solid particle concentration in the range from about 10 to about 30 percent;
    (b) filtering said overflow aqueous stream to form a product filtrate and a filter cake;
    (c) combining said filter cake with said underflow aqueous stream of said first centrifuge to form a slurry;

(d) admixing water with said slurry to form a slurry of reduced specific gravity;
(e) passing said slurry of reduced specific gravity through a second centrifuge to form:
  (i) a second overflow aqueous solution having a solid particle concentration in the range from about 0.01 to about 0.05 percent, and
  (ii) a second underflow aqueous solution having a solid particle concentration in the range from about 80 to about 90 percent;
(f) admixing said second overflow aqueous stream with an alkali metal halide to form a brine; and
(g) feeding said brine to an electrolytic cell.

6. A process for removing and recovering precipitated chromium compounds from an aqueous alkali metal chlorate solution containing them which comprises:
(a) passing said aqueous solution containing said solid particles through a first centrifuge to form:
  (i) an overflow aqueous solution having a solid particle concentration in the range from about 0.02 to about 0.05 percent, and
  (ii) an underflow aqueous solution having a solid particle concentration in the range from about 10 to about 30 percent;
(b) filtering said overflow aqueous stream to form a product filtrate and a filter cake;
(c) combining said filter cake with said underflow aqueous stream of said first centrifuge to form a slurry;
(d) admixing water with said slurry to form a slurry of reduced specific gravity;
(e) passing said slurry of reduced specific gravity throug a second centrifuge to form:
  (i) a second overflow aqueous solution having a solid particle concentration in the range from about 0.01 to about 0.05 percent, and
  (ii) a second underflow aqueous solution having a solid particle concentration in the range from about 80 to about 90 percent;
(f) admixing said second overflow aqueous stream with an alkali metal halide to form a brine; and
(g) feeding said brine to an electrolytic cell.

7. The process of claims 5 or 6, wherein said particles of divalent or trivalent chromium compounds are recovered and oxidized to the hexavalent state and employed in electrolytic sodium chlorate cells.

8. The process of claim 1, wherein the concentration of said alkali metal chloride is in the range from about 100 to about 750 grams alkali metal chlorate per liter.

9. The process of claim 8, wherein said alkali metal chlorate is sodium chlorate.

10. The process of claim 9, wherein said alkali metal chlorate is potassium chlorate.

11. The process of claim 10, wherein the concentration of said hexavalent chromium is said impure aqueous solution is in the range from about 0.1 to about 20.0 grams hexavalent chromium per liter.

12. The process of claim 10, wherein the hexavalent chromium is present in said impure aqueous solution as sodium dichromate.

13. The process of claim 10, wherein said hexavalent chromium is present in said impure aqueous solution as sodium chromate.

14. The process of claim 10, wherein said hexavalent chromium is present in said impure aqueous solution as chromic acid.

15. The process of claim 14, wherein said inorganic sulfur containing compound is added in a proportion sufficient to provide a molar ratio of said inorganic sulfur containing compound to said hexavalent chromium is in the range from about 2.2:1 to about 14:1.

16. The process of claim 15, wherein said inorganic sulfur containing compound is added in proportion sufficient to provide a molar ratio of said inorganic sulfur containing compound to said hexavalent chromium is in the range from about 2.4:1 to about 12:1.

17. The process of claim 16, wherein the temperature of said impure aqueous solution is in the range from about 20° to about 100° C.

18. The process of claim 17, wherein the temperature of said impure aqueous solution is in the range from about 25° to about 80° C.

19. The process of claim 18, wherein an inorganic base employed to adjust the pH of said impure aqueous solution to a first intermediate pH is an alkali metal hydroxide.

20. The process of claim 19, wherein said alkali metal hydroxide is sodium hydroxide.

21. The process of claim 19, wherein an inorganic acid employed to adjust the first intermediate pH of said impure aqueous solution to said second intermediate pH is hydrochloric acid.

22. The process of claim 21, wherein an inorganic base employed to adjust the second intermediate pH to a final pH is an alkali metal hydroxide.

23. The process of claim 22, wherein said alkali metal hydroxide is sodium hydroxide.

24. The process of claim 23, wherein the alkali metal hypohalite is present in said impure aqueous solution at a concentration in the range from about 0.1 to about 50.0 grams alkali metal hypohalite per liter.

25. The process of claim 24, wherein the concentration of said alkali metal hypohalite is in the range from about 0.5 to about 2.0 grams alkali metal hypohalite per liter.

26. The process of claim 25, wherein said alkali metal hypohalite is an alkali metal hypochlorite.

27. The process of claim 26, wherein said alkali metal hypochlorite is sodium hypochlorite.

28. A process for removing hexavalent chromium from an impure aqueous alkali metal chlorate solution containing hexavalent chromium as an impurity which comprises:
(a) adjusting the pH of said impure aqueous solution to a first intermediate pH in the range from about 9 to about 13;
(b) reacting an inorganic sulfur compound selected from the group consisting of alkali metal bisulfite, alkali metal sulfite, alkali metal thiosulfate, alkali metal metabisulfite, alkaline earth metal bisulfite, alkali metal dithionite, alkaline earth metal dithionite, ferric sulfite, ferric thiosulfate, and mixtures thereof with said impure aqueous solution to form an aqueous slurry of solid particles of trivalent and divalent chromium compounds in an aqueous solution;
(c) adjusting the pH of said aqueous slurry of alkali metal chloride to a second intermediate pH in the range from about 2 to about 4,
(d) further adjusting the pH of said aqueous slurry to a final pH in the range from about 6 to about 8;
(e) separating said solid particles of divalent and trivalent chromium compounds from the aqueous solution, whereby H$_2$S is organoleptically nondetectable and
(f) passing said aqueous solution containing said solid particles through a first centrifuge to form:
  (i) an overflow aqueous solution, and
  (ii) an underflow aqueous solution,
(g) filtering said overflow aqueous stream to form a product filtrate and a filter cake;
(h) combining said filter cake with said underflow aqueous stream of said first centrifuge to form a slurry;
(i) admixing water with said slurry to form a slurry of reduced specific gravity;
(j) passing said slurry of reduced specific gravity through a second centrifuge to form:
  (i) a second overflow aqueous solution, and
  (ii) a second underflow aqueous solution
(k) admixing said second overflow aqueous stream with an alkali metal halide to form a brine; and
(l) feeding said brine to an electrolytic cell.

* * * * *

UNITED STATES PATENT AND TRADEMARK OFFICE
CERTIFICATE OF CORRECTION

PATENT NO. : 4,259,297
DATED : March 31, 1981
INVENTOR(S) : Jerry J. Kaczur and Sudhir K. Mendiratta It is certified that error appears in the above-identified patent and that said Letters Patent are hereby corrected as shown below:

In Column 5, line 48, after "thereof" delete "; (ix) alkaline earth metal . . . and mixtures thereof".

In Column 5, line 62, delete "(1)" above the equation.

In Column 10, line 22, delete "filtrated" and insert --filtrate--.

In Column 13, Claim 6, section (e), second line, delete "throug" and insert --through--.

In Column 14, Claim 28, section (c), second line, delete "chloride" and insert --chlorate--.

Signed and Sealed this

Eleventh Day of August 1981

[SEAL]

Attest:

GERALD J. MOSSINGHOFF

Attesting Officer

Commissioner of Patents and Trademarks